United States Patent
Ryu et al.

(10) Patent No.: US 12,062,231 B2
(45) Date of Patent: Aug. 13, 2024

(54) INUNDATION AND OVERFLOW PREDICTION SYSTEM USING DRONE IMAGES AND ARTIFICIAL INTELLIGENCE

(71) Applicant: FMworks Inc., Daegu (KR)

(72) Inventors: Jungrim Ryu, Daegu (KR); Sangbok Lee, Daegu (KR); Sunmee Park, Gimcheon-si (KR); Heeyong Choi, Jecheon-si (KR); Hyeonggil Choi, Seoul (KR); Taegyu Lee, Uiwang-si (KR); Wonchang Kim, Jecheon-si (KR)

(73) Assignee: FMWORKS INC., Daegu (KR)

( * ) Notice: Subject to any disclaimer, the term of this patent is extended or adjusted under 35 U.S.C. 154(b) by 0 days.

(21) Appl. No.: 18/501,020

(22) Filed: Nov. 2, 2023

(65) Prior Publication Data
US 2024/0153264 A1   May 9, 2024

(30) Foreign Application Priority Data

Nov. 4, 2022  (KR) .................. 10-2022-0146111
Nov. 25, 2022 (KR) .................. 10-2022-0160144

(51) Int. Cl.
   *G06V 20/17* (2022.01)
(52) U.S. Cl.
   CPC .................. *G06V 20/17* (2022.01)
(58) Field of Classification Search
   CPC .................................... G06V 20/17
   See application file for complete search history.

(56) References Cited

U.S. PATENT DOCUMENTS

| | | | |
|---|---|---|---|
| 11,873,238 B2 * | 1/2024 | Bose | C02F 1/5209 |
| 2022/0100986 A1 * | 3/2022 | Tanaka | G06N 20/00 |
| 2022/0222824 A1 * | 7/2022 | Usumezbas | G06T 17/205 |
| 2022/0358746 A1 * | 11/2022 | Kim | G06V 20/10 |

(Continued)

FOREIGN PATENT DOCUMENTS

| | | |
|---|---|---|
| KR | 101754333 B1 | 7/2017 |
| KR | 20200052500 A | 5/2020 |

(Continued)

*Primary Examiner* — Ming Y Hon
(74) *Attorney, Agent, or Firm* — NKL LAW; Jae Youn Kim

(57) ABSTRACT

Disclosed is an inundation and overflow prediction system, and particularly, when there is provided an inundation and overflow prediction system, which can visually express the areas and degree of inundation and overflow on an orthophotograph, a Digital Elevation Model, and a Digital Surface Model based on images captured by a drone, which can reflect the latest environment and provide accurate numerical data, visualized information on inundated areas may be used in real-time for management of land to identify areas vulnerable to inundation and overflow and quickly respond to disasters, and objective information on numerical data may be provided in selecting locations for installing safety facilities against flood. Additionally, reports and documents, drawings for creating data, and visible simulation values may be output to supports works, and, there is an effect of constructing and utilizing a database regarding maintenance of social infrastructures through continuously learning of drone images.

6 Claims, 4 Drawing Sheets

(56) References Cited

U.S. PATENT DOCUMENTS

| | | | |
|---|---|---|---|
| 2023/0039554 A1* | 2/2023 | Chen | G06V 10/764 |
| 2023/0230250 A1* | 7/2023 | Vianello | G06V 10/82 |
| | | | 382/159 |
| 2023/0419501 A1* | 12/2023 | Buczkowski | G06V 10/776 |
| 2024/0017478 A1* | 1/2024 | Z'Rotz | C08L 23/14 |
| 2024/0020775 A1* | 1/2024 | Campbell | G06Q 50/02 |

FOREIGN PATENT DOCUMENTS

| | | | |
|---|---|---|---|
| KR | 20200115933 A | 10/2020 | |
| KR | 102288433 B1 | 8/2021 | |
| KR | 102314013 B1 | 10/2021 | |
| KR | 102315971 B1 | 10/2021 | |

\* cited by examiner

INUNDATION AND OVERFLOW PREDICTION SYSTEM USING DRONE IMAGES AND ARTIFICIAL INTELLIGENCE

BACKGROUND OF THE INVENTION

Field of the Invention

The present invention relates to an inundation and overflow prediction system, and particularly, to an inundation and overflow prediction system using drone images and artificial intelligence, which can visually express the areas and degree of inundation and overflow on an orthophotograph, a Digital Elevation Model (DEM), and a Digital Surface Model (DSM) on the basis of images captured by a drone, which can reflect the latest environment as is and provide accurate numerical data. In the present invention, inundation refers to a state of being submerged in water, and overflow means phenomenon of normally-trapped water (such as, rivers, streams, creeks, brooks, sea, and ocean) flowing over its boundary.

Background of the Related Art

Generally, as the frequency of flood increases recently due to climate change and global warming, a function capable of more accurately predicting and visualizing an inundation and overflow situation is required, and methods currently applied are no more than grasping two-dimensional inundation and overflow based on a Geographic Information System (GIS) and propagation paths of flood through a hydrodynamic analysis, on the basis of opened digital topographic maps and geographic information provided by the National Spatial Data Infrastructure Portal or the like.

However, grades corresponding to a degree of infiltration of water based on a land cover map are not provided, and the land cover map also has a problem of being unrealistic compared to an actual environment.

That is, in Japan, permeability is actual applied by subdividing the type of land cover, whereas in Korea, existing prediction methods related to inundation and overflow utilize land cover maps provided by "Environmental Geographic Information Service" since permeability is classified into 0% or 100%.

In addition, as boundaries of land covers are not up to date in accordance with land development status, greening projects, and installation of safety facilities, there is a limit in deriving accurate simulation results.

SUMMARY OF THE INVENTION

Therefore, the present invention has been made in view of the above problems, and it is an object of the present invention to provide an inundation and overflow prediction system using drone images and artificial intelligence, which can visually express the areas and degree of inundation and overflow on an orthophotograph, a Digital Elevation Model (DEM), and a Digital Surface Model (DSM) on the basis of images captured by a drone, which can reflect the latest environment as is and provide accurate numerical data.

To accomplish the above object, according to one aspect of the present invention, there is provided an inundation and overflow prediction system preparing for inundation and overflow using drone images and artificial intelligence, the system comprising: an input unit for receiving information on a land cover map from a public institution and aerial image data captured by a drone, generating an orthophotograph and DSM/DEM data based thereon, and outputting the land cover map, orthophotograph, and DEM/DSM data; and an operation unit configured of a deep learning object detection algorithm for receiving the land cover map, orthophotograph, and DEM/DSM data output from the input unit, setting a land cover boundary of an area for predicting inundation and overflow on the basis of the land cover map or the orthophotograph, performing simulation based on permeability according to a type of land cover and an altitude value of the DSM on the basis of precipitation information in the area, and learning information on the type of land cover in the orthophotograph and permeability of a land cover of that type.

As an additional feature of the inundation and overflow prediction system using drone images and artificial intelligence according to the present invention for achieving the object, the input unit is configured to execute: a land cover map input module for receiving a land cover map of an arbitrary area where inundation damage is expected to occur from a corresponding public institution; a drone-captured data input module for receiving aerial image data of a current state in an area captured by the drone, where inundation damage is expected to occur; an orthophotograph conversion module for converting the aerial image data acquired through the drone-captured data input module into an orthophotograph; and a DSM/DEM information acquisition module for acquiring DSM information generated in the process of converting the aerial image data into an orthophotograph through the orthophotograph conversion module, and DEM information acquired by processing the DSM information in response to a request.

As an additional feature of the inundation and overflow prediction system using drone images and artificial intelligence according to the present invention for achieving the object, the operation unit is configured to execute: an input data composite processing module having a deep learning object detection algorithm for receiving the land cover map, orthophotograph, and DEM and DSM information obtained through the input unit, setting a boundary of the land cover on the basis of the land cover map or the orthophotograph, and learning information on the type of land cover in the orthophotograph and permeability of a land cover of that type; a precipitation input module for receiving precipitation (history data based on minimum, average, and maximum values) according to features of an area where inundation damage is expected or simulated; an inundation and overflow simulation module for performing simulation based on the permeability according to the type of land cover and the altitude value of the DSM according to the precipitation input module on the basis of data preprocessed by the input data composite processing module; and an information generation module for generating a result of the simulation performed by the inundation and overflow simulation module in a TIFF format and a GIF file like the DSM.

As an additional feature of the inundation and overflow prediction system using drone images and artificial intelligence according to the present invention for achieving the object, the input data composite processing module includes: an input data composite operation module for receiving information on the land cover map input through the input unit, the orthophotograph acquired through the image captured by the drone, DSM information according thereto, and DEM information according to the DSM information, and matching corresponding information of the same area; an orthophotograph-based boundary setting module for setting the boundary of the land cover by reorganizing the information matched by the input data composite operation module around the orthophotograph; and a land cover map-based boundary setting module for setting the boundary of the land cover by reorganizing the information matched by the input data composite operation module around the land cover map.

As an additional feature of the inundation and overflow prediction system using drone images and artificial intelligence according to the present invention for achieving the object, the system further comprises an artificial intelligence deep learning module linked to the input data composite operation module, and configured of a deep learning object detection algorithm for learning information on the type of land cover in the orthophotograph and permeability of a land cover of that type, to enhance efficiency of the input data composite operation module.

As an additional feature of the inundation and overflow prediction system using drone images and artificial intelligence according to the present invention for achieving the object, the inundation and overflow simulation module includes: an inundation simulation module for receiving data preprocessed by the input data composite processing module, and simulating whether an inundation situation occurs on the basis of permeability according to the type of land cover according to the precipitation input module; and an overflow simulation module for receiving data preprocessed by the input data composite processing module, and simulating whether an overflow situation occurs by applying precipitation data according to the precipitation input module on the basis of the altitude value of the DSM.

As an additional feature of the inundation and overflow prediction system using drone images and artificial intelligence according to the present invention for achieving the object, the system further comprises an analysis unit for performing simulation according to variation in a surrounding environment or a location of a disaster prevention facility by varying the environment or the location on the basis of the simulation performed by the operation unit.

As an additional feature of the inundation and overflow prediction system using drone images and artificial intelligence according to the present invention for achieving the object, the analysis unit is configured to execute: a simulation information analysis module for analyzing a result of the simulation on the basis of the simulation performed by the inundation and overflow simulation module of the operation unit; and an environment variation simulation module for performing simulation according to variation in a surrounding environment or a location of a disaster prevention facility by varying the environment or the location on the basis of the simulation performed by the inundation and overflow simulation module of the operation unit.

As an additional feature of the inundation and overflow prediction system using drone images and artificial intelligence according to the present invention for achieving the object, the environment variation simulation module includes: a cross-sectional view generation module for generating a cross-sectional view of an area corresponding to a simulation on the basis of information analyzed by the simulation information analysis module; an infiltration block simulation information variation module for generating information for simulation by varying an installation location of an infiltration block on the basis of information on a cross-section of a ground surface generated through the cross-sectional view generation module; a water storage tank simulation information variation module for generating information for simulation by varying an installation location and a capacity of a water storage tank on the basis of information on the cross-section of the ground surface generated through the cross-sectional view generation module; and a variable information simulation module for acquiring information on a change in an environment for preventing disaster by performing again the simulation of inundation and overflow on the basis of information on the infiltration block and the water storage tank, for which information has been changed through the infiltration block simulation information variation module and the water storage tank simulation information variation module.

When the inundation and overflow prediction system according to the present invention is provided, visualized information on inundated areas may be used in real-time for management of land to identify areas vulnerable to inundation and overflow and quickly respond to disasters, and objective information on numerical data may be provided in selecting locations for installing safety facilities against flood, such as installation of infiltration blocks, water storage tanks, and the like.

In addition, various kinds of reports and documents, drawings needed for creating data, and visible simulation values may be output to supports works, and in the long run, there is an effect of constructing and utilizing a database from the aspect of maintenance of social infrastructures through continuously learning of drone images.

DETAILED DESCRIPTION OF THE PREFERRED EMBODIMENT

Summarizing the terms used in the present invention before explaining hereinafter an inundation and overflow prediction system using drone images and artificial intelligence according to the present invention with reference to the attached drawings, a Digital Elevation Model (hereinafter, referred to as DEM) is a numerical model that expresses the bare earth portion of real-world geographic information excluding buildings, trees, artificial structures, and the like.

In addition, a Digital Surface Model (hereinafter, referred to as DSM) is a model that expresses all information of the real world, such as terrain, trees, buildings, artificial structures, and the like.

In addition, an orthophotograph is an image that corrects geometric distortions generated due to topographical undulations such as height difference or tilt in aerial photographs, image information from satellites, or the like, and converts all objects into a view seen vertically from the top, which refers to an image map compiled at a predetermined size together with coordinates, periods, and the like recorded therein.

Figure 1:
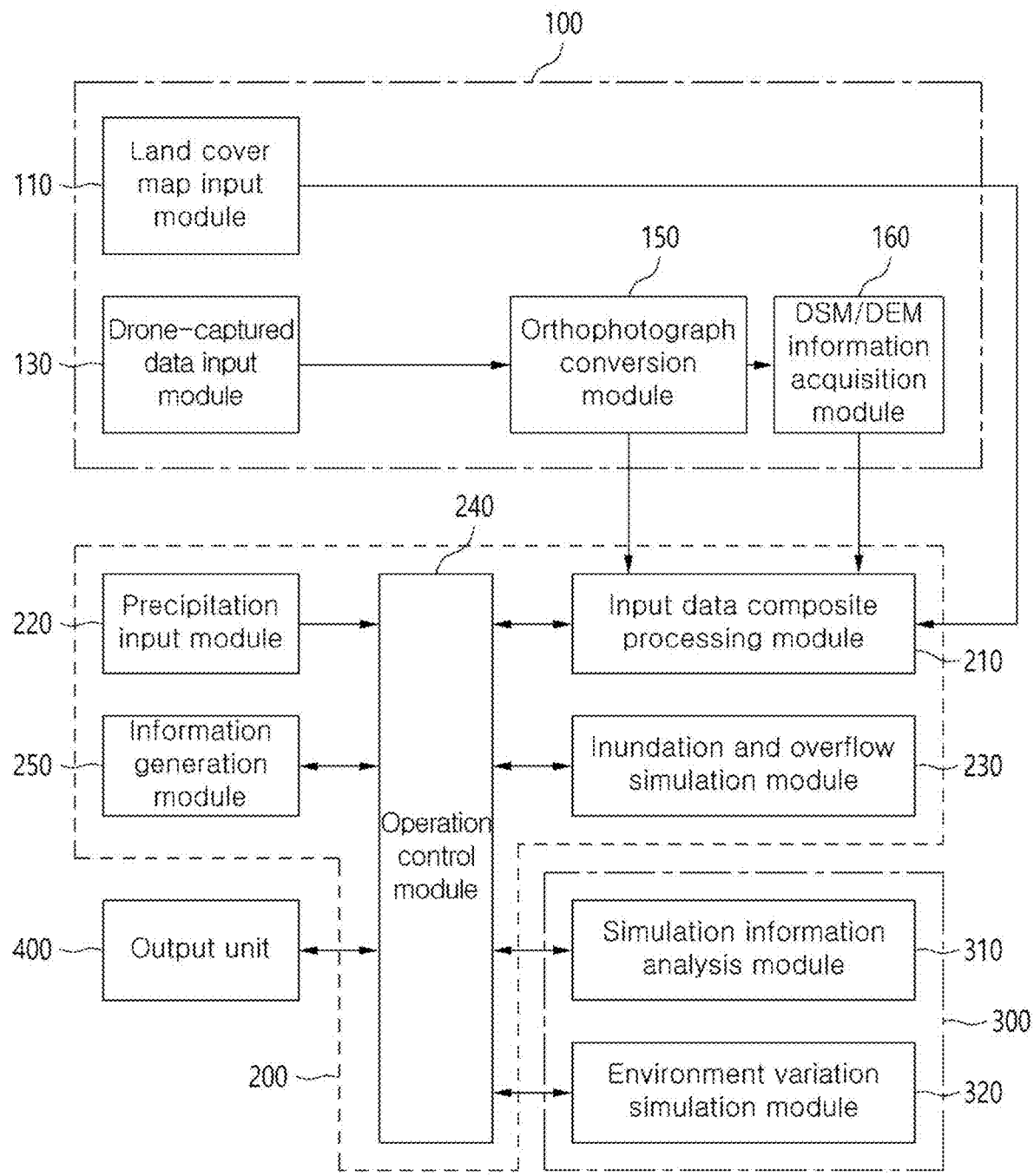
FIG. 1 is a block diagram showing the configuration of an inundation and overflow prediction system using drone images and artificial intelligence according to the present invention.

Describing the configuration of the inundation and overflow prediction system using drone images and artificial intelligence according to the present invention with reference to the attached FIG. 1, the system is largely configured of an input unit (processor) 100 for receiving information on a land cover map from a public institution and aerial image data captured by a drone, generating an orthophotograph and an DSM/DEM data based thereon, and outputting the land cover map, orthophotograph, and DEM/DSM data; an operation unit (processor) 200 configured of a deep learning object detection algorithm for receiving the land cover map, orthophotograph, and DEM/DSM data output from the input unit 100, setting a land cover boundary of an area for predicting inundation and overflow on the basis of the land cover map or the orthophotograph, performing simulation based on permeability according to a type (kind) of land cover and an altitude value of the DSM on the basis of precipitation information in the area, and learning information on the type of land cover in the orthophotograph and permeability of a land cover of that type; an analysis unit (processor) 300 for performing simulation according to variation in a surrounding environment or a location of a disaster prevention facility by varying the environment or the location on the basis of the simulation performed by the operation unit 200; and an output unit (processor) 400 for expressing a result of each of the simulations performed by the operation unit 200 and the analysis unit 300, and information on the area.

Describing details of the configuration described above, the input unit 100 is configured of a land cover map input module 110 for receiving a land cover map of an arbitrary area where inundation damage is expected to occur from a corresponding public institution; a drone-captured data input module 130 for receiving aerial image data of the current state in the area captured by the drone, where inundation damage is expected to occur; an orthophotograph conversion module 150 for converting the aerial image data acquired through the drone-captured data input module 130 into an orthophotograph; and a DSM/DEM information acquisition module 160 for acquiring DSM information generated in the process of converting the aerial image data into an orthophotograph through the orthophotograph conversion module 150, and DEM information acquired by processing the DSM information in response to a request.

Figure 2:
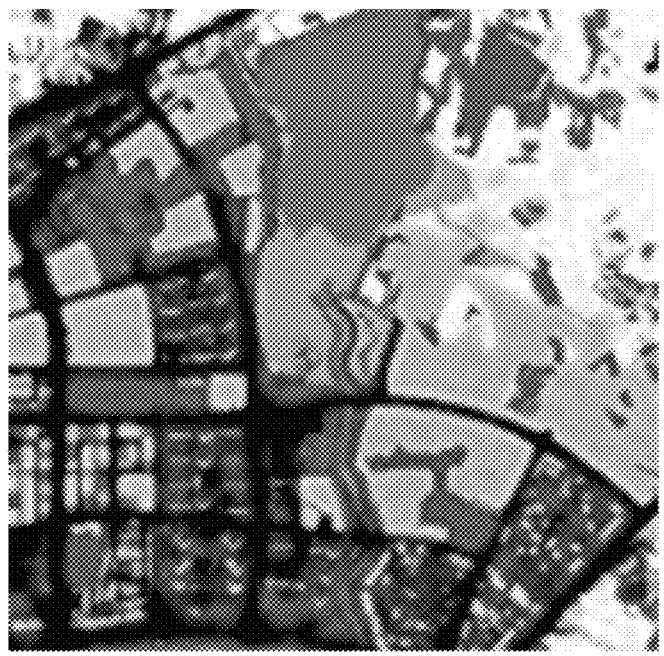
FIGS. 2 to 4 are exemplary views showing photographs of a land cover map, an orthophotograph, and a DSM used in an inundation and overflow prediction system using drone images and artificial intelligence according to the present invention.
Figure 3:
Figure 4:
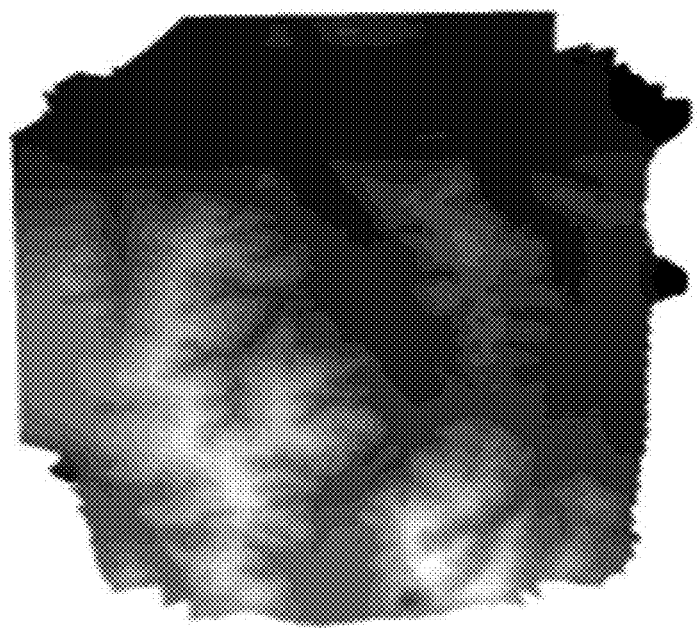

At this point, an image of the land cover map acquired through the land cover map input module 110 is as shown in the attached FIG. 2, an orthophotograph image generated through the orthophotograph conversion module 150 is as shown in the attached FIG. 3, and a DSM image acquired through the DSM/DEM information acquisition module 160 is as shown in the attached FIG. 4.

In addition, the operation unit 200 includes an input data composite processing module 210 having a deep learning object detection algorithm for receiving the land cover map, orthophotograph, and DEM and DSM information obtained through the input unit 100, setting a boundary of the land cover on the basis of the land cover map or the orthophotograph, and learning information on the type of land cover in the orthophotograph and permeability of a land cover of that type; a precipitation input module 220 for receiving precipitation (history data based on minimum, average, and maximum values) according to the features of an area where inundation damage is expected or simulated; an inundation and overflow simulation module 230 for performing simulation based on the permeability according to the type of land cover and the altitude value of the DSM according to the precipitation input module 220 on the basis of data preprocessed by the input data composite processing module 210; and an information generation module 250 for generating a result of the simulation performed by the inundation and overflow simulation module 230 in a TIFF format and a GIF file like the DSM.

Figure 5:
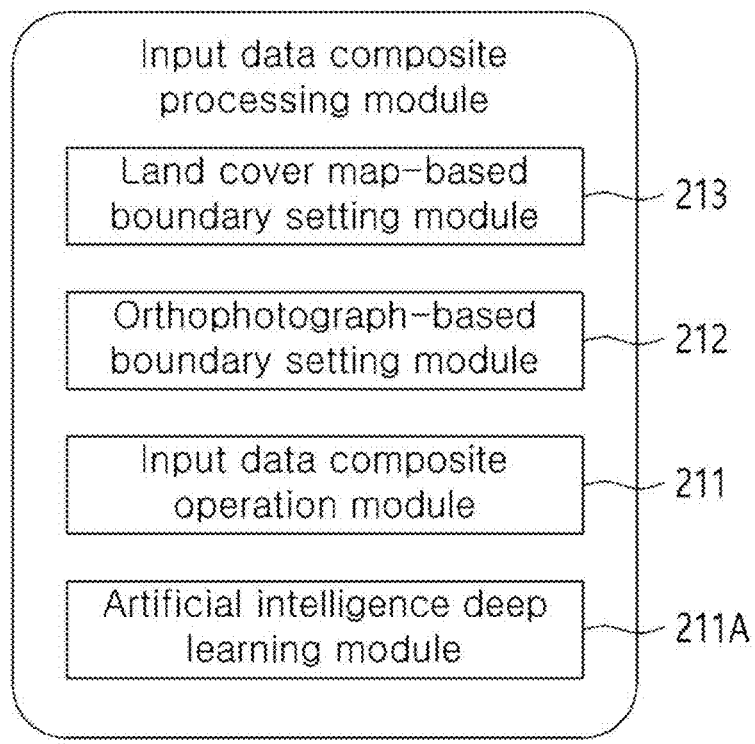
FIGS. 5 to 7 are exemplary views showing the detailed configuration of major parts of the inundation and overflow prediction system using drone images and artificial intelligence according to the present invention.

At this point, as shown in the attached FIG. 5, the input data composite processing module 210 is configured of an input data composite operation module 211 for receiving information on the land cover map input through the input unit 100, the orthophotograph acquired through the image captured by the drone, DSM information according thereto, and DEM information according to the DSM information, and matching corresponding information of the same area; an orthophotograph-based boundary setting module 212 for setting the boundary of the land cover by reorganizing the information matched by the input data composite operation module 211 around the orthophotograph; and a land cover map-based boundary setting module 213 for setting the boundary of the land cover by reorganizing the information matched by the input data composite operation module 211 around the land cover map.

At this point, an artificial intelligence deep learning module 211A linked to the input data composite operation module 211 is further provided, and the artificial intelligence deep learning module 211A is configured of a deep learning object detection algorithm for learning information on the type of land cover in the orthophotograph and permeability of a land cover of that type, and this is to enhance the efficiency of the input data composite operation module 211.

Figure 6:
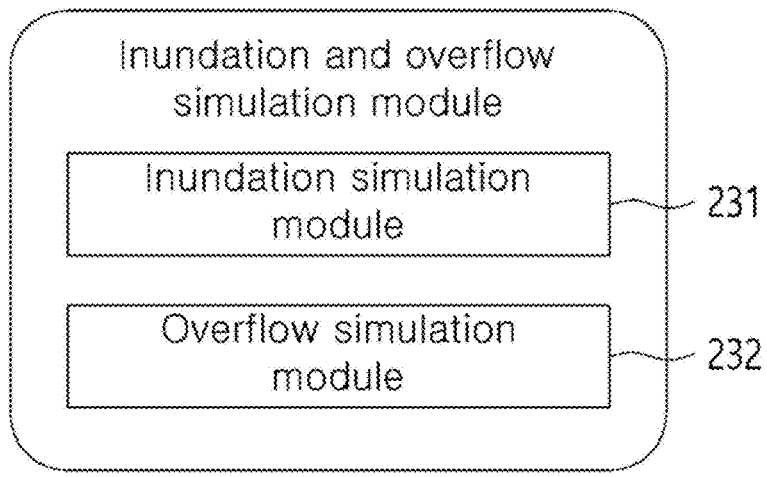

As shown in the attached FIG. 6, the inundation and overflow simulation module 230 is configured of an inundation simulation module 231 for receiving data preprocessed by the input data composite processing module 210, and simulating whether an inundation situation occurs on the basis of permeability according to the type of land cover according to the precipitation input module; and an overflow simulation module 232 for receiving data preprocessed by the input data composite processing module 210, and simulating whether an overflow situation occurs by applying precipitation data according to the precipitation input module 220 on the basis of the altitude value of the DSM.

In addition, the analysis unit 300 is configured of a simulation information analysis module 310 for analyzing a result of the simulation on the basis of the simulation performed by the inundation and overflow simulation module 230 of the operation unit 200; and an environment variation simulation module 320 for performing simulation according to variation in a surrounding environment or a location of a disaster prevention facility by varying the environment or the location on the basis of the simulation performed by the inundation and overflow simulation module 230 of the operation unit 200.

Figure 7:
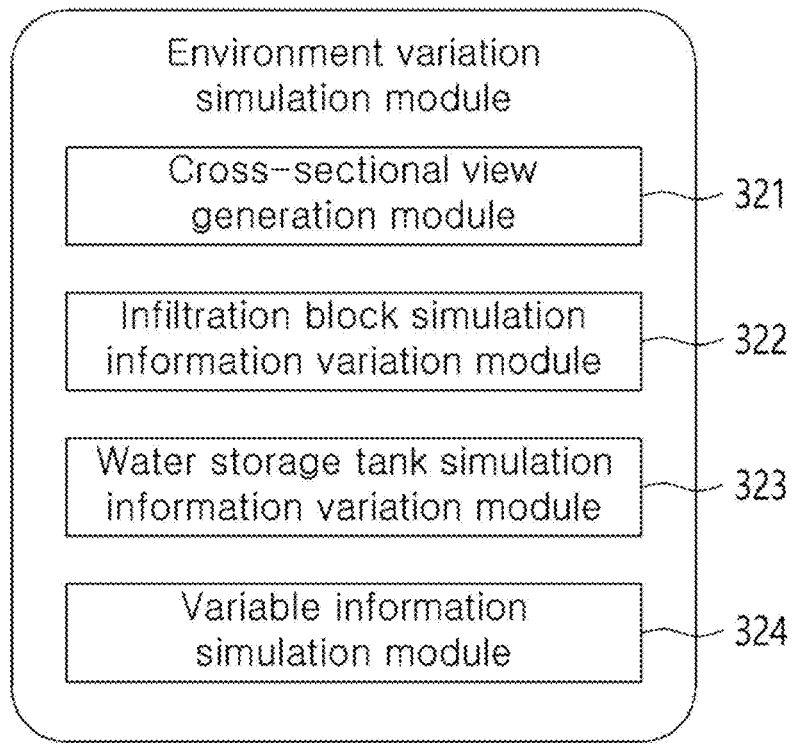

At this point, as shown in the attached FIG. 7, the environment variation simulation module 320 is configured of a cross-sectional view generation module 321 for generating a cross-sectional view of an area corresponding to a simulation on the basis of information analyzed by the simulation information analysis module 310; an infiltration block simulation information variation module 322 for generating information for simulation by varying the installation location of an infiltration block on the basis of information on the cross-section of the ground surface generated through the cross-sectional view generation module 321; a water storage tank simulation information variation module 323 for generating information for simulation by varying the installation location and capacity of a water storage tank on the basis of information on the cross-section of the ground surface generated through the cross-sectional view generation module 321; and a variable information simulation module 324 for acquiring information on the change in the environment for preventing disaster by performing again the simulation of inundation and overflow on the basis of information on the infiltration block and the water storage tank, for which the information has been changed through the infiltration block simulation information variation module 322 and the water storage tank simulation information variation module 323.

Describing the overall operation and management method of the inundation and overflow prediction system according to the present invention configured as described above, a part to be described first is a part related to the boundary of a land cover.

Processing the boundary of a land cover is important for simulation of inundation and overflow according to the present invention, and the boundary processing allows a user to select and apply a boundary of a land cover on the basis of a land cover map or orthophotograph according to the business purpose and priority of the information.

First, when a simulation is performed focusing on the land cover map, existing land cover boundaries are maintained, and information attributes of a shapefile (hereinafter, referred to as SHP) are mapped.

At this point, an SHP format may spatially describe vector functions of points, lines, and polygons representing, for example, wells, rivers, and lakes, and it is a geospatial vector data format for geographic information system (GIS) software, in which each item generally has an attribute that describes the item, such as a name or temperature.

Therefore, when various land covers exist in one section, simulation is performed using the type and permeability of a land cover that occupies the largest area.

On the contrary, when simulation is performed on the basis of the orthophotograph, the boundary of the land cover is ignored, and the simulation should be performed by newly defining spatial information since the type of a land cover varies in an actual image. Although there is a disadvantage in that the time and resources (computer performance, etc.) required increase compared to the simulation based on the land cover described above, as simulation may be performed at the current time point, it has an advantage of being capable of simulating more realistically compared to the simulation based on the land cover performed in the past. Therefore, users may modify the type and permeability of a land cover.

In Korea, when the Environmental Geographic Information Service is used, information on the land cover may be provided as an SHP file. However, information on the land cover is not current data as it is updated on the basis of a predetermined time point (at a time point of an investigation work by a public institution).

At this point, a drone includes data such as altitudes, coordinates, and shooting angles in the image data of a picture as metadata.

Accordingly, the land cover map input module 110 of the input unit 100 receives a land cover map of an arbitrary area where inundation damage is expected to occur from a corresponding public institution through an Internet environment.

At this point, the image according to the land cover map has a shape as shown in the attached FIG. 2.

On the contrary, for an area captured by a drone, where inundation damage is expected to occur, aerial image data of the current state is provided to the drone-captured data input module 130 through a memory device, and on the basis of the metadata included in the image of the area, where inundation damage is expected to occur, output from the drone-captured data input module 130, the orthophotograph conversion module 150 converts the aerial image data into an orthophotograph as shown in the attached FIG. 3, and outputs the orthophotograph.

At this point, the DSM information generated in the process of obtaining the orthophotograph by the orthophotograph conversion module 150 is acquired through the DSM/DEM information acquisition module 160, and a DSM information image as shown in the attached FIG. 4 is generated.

At this point, when a request (control) informing that DEM information is needed is received, the DSM/DEM information acquisition module 160 generates the DEM information on the basis of the acquired DSM information. In addition, opened DEM information may be acquired from the outside.

Conventionally, the DSM or DEM is input according to the use purpose of a user, and it is general that the DSM is used in an urban area with many buildings, and the DEM is used in a forest and mountainous area with many trees.

Thereafter, the input data composite processing module 210 of the operation unit 200 receives the land cover map, orthophotograph, and DSM/DEM information obtained through the land cover map input module 110, the orthophotograph conversion module 150, and the DSM/DEM information acquisition module 160, matches information of the same area, and sets a boundary of the land cover on the basis of the land cover map or the orthophotograph according to selection of the user.

The operation of the input data composite processing module 210 described above is implemented through the input data composite operation module 211, the orthophotograph-based boundary setting module 212, the land cover map-based boundary setting module 213, and the artificial intelligence deep learning module 211A, and as the operation of each component is overlapped with the configuration described in FIG. 5, it will be omitted.

When the boundary of the land cover is set through any one among the orthophotograph-based boundary setting module 212 and the land cover map-based boundary setting module 213 through the input data composite processing module 210, the inundation and overflow simulation module 230 simulates whether an inundation or overflow phenomenon occurs and a degree thereof on the basis of the precipitation in a corresponding area (history data based on minimum, average, and maximum values) input through the precipitation input module 220.

At this point, the information generation module 250 generates a result of the simulation performed by the inundation and overflow simulation module 230 in a TIFF format and a GIF file (dynamic image) like the DSM, and the information generation module 250 also processes the simulation result of the analysis unit 300 described below, and performs a function of processing the information expressed through the output unit 400.

In addition, the inundation and overflow simulation module 230 may be divided into an inundation simulation module 231 and an overflow simulation module 232 as shown in the attached FIG. 6, or both inundation damage and overflow damage may be predicted through one simulation.

In this way, when simulation of inundation and overflow is performed in a specific area, it needs to confirm the locations and capacities of disaster prevention facilities for preventing inundation and overflow on the basis of the simulation, and this is accomplished through the analysis unit 300.

That is, the simulation information analysis module 310 of the analysis unit 300 analyzes the result of the simulation on the basis of the simulation performed by the inundation and overflow simulation module 230 of the operation unit 200 to determine vulnerable areas, vulnerable shapes, and the like.

Thereafter, the environment variation simulation module 320 determines whether inundation or overflow is prevented through simulation while varying the location and capacity of the disaster prevention facilities on the basis of the simulation performed by the inundation and overflow simulation module 230 of the operation unit 200.

Therefore, through the environment variation simulation module 320, an optimal environment (installation location of infiltration blocks, installation location and capacity of water storage tanks) for preventing inundation or overflow may be confirmed.

The description of the cross-sectional view generation module 321, the infiltration block simulation information variation module 322, the water storage tank simulation information variation module 323, and the variable information simulation module 324 constituting the environment variation simulation module 320 is overlapped with the description of FIG. 7, description thereof will be omitted.

Although an existing inundation and overflow prediction system may not virtually change the infiltration block, land cover, installation of water storage tank in a smooth way through the inundation and overflow prediction system according to the present invention described above, in the prediction system of the present invention, a user may easily change and input an installation site (area) of an infiltration block, and perform simulation by positioning a water storage tank at a location (x, y, z) desired by the user after inputting the scale (width×length×height, capacity) of the water storage tank.

Therefore, there is an effect of easily deriving optimal alternatives in an area where inundation and overflow damage occurs, such as an area where inundation damage frequently occurs, an area with heavy rainfall, and the like, according to current installation of disaster safety facilities for safety of people.

Although preferred embodiments of the present invention have been shown and described above, the present invention is not limited to the specific embodiments described above, and various modifications can be made by those skilled in the art without departing from the gist of the present invention as claimed in the patent claims, and these modified implementations should not be understood individually from the technical spirit or perspective of the present invention.

DESCRIPTION OF SYMBOLS

100: Input unit
110: Land cover map input module
130: Drone-captured data input module
150: Orthophotograph conversion module
160: DSM/DEM information acquisition module
200: Operation unit
210: Input data composite processing module
211: Input data composite operation module
211A: Artificial intelligence deep learning module
212: Orthophotograph-based boundary setting module
213: Land cover map-based boundary setting module
220: Precipitation input module
230: Inundation and overflow simulation module
231: Inundation simulation module
232: Overflow simulation module
240: Operation control module
250: Information generation module
300: Analysis unit
310: Simulation information analysis module
320: Environment variation simulation module
321: Cross-sectional view generation module
322: Infiltration block simulation information variation module
323: Water storage tank simulation information variation module
324: Variable information simulation module
400: output unit

What is claimed is:

1. An inundation and overflow simulation system configured to simulate an inundation or an overflow using aerial image data and artificial intelligence, the system comprising:

an input processor for receiving information on a land cover map from a public institution and the aerial image data captured by a drone, generating an orthophotograph, Digital Surface Model (DSM) information, and Digital Elevation Model (DEM) information based on the received information, and outputting the land cover map, the orthophotograph, the DSM information, and the DEM information; and an operation processor configured for executing a deep learning object detection algorithm for receiving the land cover map, the orthophotograph, the DSM information, and the DEM information output from the input processor, setting a land cover boundary of a land cover area for simulating the inundation or the overflow on the basis of the land cover map or the orthophotograph, performing simulation based on permeability according to a kind of land cover and an altitude value of the DSM information on the basis of precipitation information in the land cover area, and learning information on the kind of land cover in the orthophotograph and the permeability of the land cover of that kind, wherein the operation processor is configured to execute:

an input data composite processing module having the deep learning object detection algorithm for receiving the land cover map, the orthophotograph, the DSM information, and the DEM information obtained through the input processor, setting the land cover boundary of the land cover area on the basis of the land cover map or the orthophotograph, and learning information on the kind of land cover in the orthophotograph and the permeability of the land cover of that kind, a precipitation input module for receiving the precipitation information including history data based on minimum, average, and maximum values according to features of the land cover area where an inundation damage is expected or simulated, an inundation and overflow simulation module for performing the simulation based on the permeability according to the kind of land cover and the altitude value of the DSM information according to the precipitation input module on the basis of data preprocessed by the input data composite processing module, and an information generation module for generating a result of the simulation performed by the inundation and overflow simulation module in a tag image file format (TIFF) file and a graphics interchange format (GIF) file; and an analysis processor for performing the simulation by varying a surrounding environment or a location of a disaster prevention facility on the basis of the simulation performed by the operation processor, wherein the analysis processor is configured to execute:

a simulation information analysis module for analyzing a result of the simulation on the basis of the simulation performed by the inundation and overflow simulation module of the operation processor, and an environment variation simulation module for performing the simulation by varying the surrounding environment or the location of the disaster prevention facility on the basis of the simulation performed by the inundation and overflow simulation module of the operation processor.

2. The system according to claim 1, wherein the input processor is configured to execute:

a land cover map input module for receiving the land cover map including the land cover area where an inundation damage is expected to occur from the public institution;

a drone-captured data input module for receiving the aerial image data of a current state in an area captured by the drone, where the inundation damage is expected to occur;

an orthophotograph conversion module for converting the aerial image data acquired through the drone-captured data input module into the orthophotograph; and a DSM/DEM information acquisition module for acquiring the DSM information generated in a process of converting the aerial image data into the orthophotograph through the orthophotograph conversion module, and the DEM information acquired by processing the DSM information in response to a request.

3. The system according to claim 1, wherein the input data composite processing module includes:

an input data composite operation module for receiving information on the land cover map input through the input processor, the orthophotograph acquired through the areal image data captured by the drone, the DSM information according thereto, and the DEM information according to the DSM information, and matching corresponding information of the land cover area;

an orthophotograph-based boundary setting module for setting the land cover boundary by reorganizing the matched information matched by the input data composite operation module around the orthophotograph; and a land cover map-based boundary setting module for setting the land cover boundary by reorganizing the matched information matched by the input data composite operation module around the land cover map.

4. The system according to claim 3, further comprising an artificial intelligence deep learning module, linked to the input data composite operation module, for learning information on the type of land cover in the orthophotograph and the permeability of the land cover of that kind, to enhance an efficiency of the input data composite operation module.

5. The system according to claim 1, wherein the inundation and overflow simulation module includes:

an inundation simulation module for receiving data preprocessed by the input data composite processing module, and simulating whether an inundation situation occurs on the basis of the permeability according to the kind of land cover according to the precipitation input module; and an overflow simulation module for receiving the data preprocessed by the input data composite processing module, and simulating whether an overflow situation occurs by applying the precipitation information according to the precipitation input module on the basis of the altitude value of the DSM information.

6. The system according to claim 1, wherein the environment variation simulation module includes:

a cross-sectional view generation module for generating a cross-sectional view of the land cover area corresponding to the simulation on the basis of information analyzed by the simulation information analysis module;

an infiltration block simulation information variation module for generating information for the simulation by varying an installation location of an infiltration block on the basis of information on a cross-section of a ground surface generated through the cross-sectional view generation module;

a water storage tank simulation information variation module for generating information for the simulation by varying an installation location and a capacity of a water storage tank on the basis of information on the cross-section of the ground surface generated through the cross-sectional view generation module; and a variable information simulation module for acquiring information on a change in an environment for preventing disaster by performing again the simulation of the inundation or overflow on the basis of information on the infiltration block and the water storage tank, for which information has been changed through the infiltration block simulation information variation module and the water storage tank simulation information variation module.

* * * * *